A. A. VOCK.
GAS REGULATING VALVE.
APPLICATION FILED DEC. 4, 1911.

1,042,850.

Patented Oct. 29, 1912.

Attest:
Ewd R. Tolson
Chas. F. Calhoun

Inventor:
Arthur A. Vock,
by Spear, Middleton, Donaldson & Spear
Attys.

COLUMBIA PLANOGRAPH CO., WASHINGTON, D. C.

UNITED STATES PATENT OFFICE.

ARTHUR A. VOCK, OF MARYSVILLE, OHIO, ASSIGNOR TO THE STANDING STAMPING COMPANY, OF MARYSVILLE, OHIO, INCORPORATED.

GAS-REGULATING VALVE.

1,042,850.  Specification of Letters Patent.  Patented Oct. 29, 1912.

Application filed December 4, 1911. Serial No. 663,682.

*To all whom it may concern:*

Be it known that I, ARTHUR A. VOCK, citizen of the United States, residing at Marysville, Ohio, have invented certain new and useful Improvements in Gas-Regulating Valves, of which the following is a specification.

The invention relates to gas regulating valves, and particularly to the means for holding the spindle of the valve in its proper relation to the casing.

The invention is shown in the accompanying drawings, in which—

Figure 1:
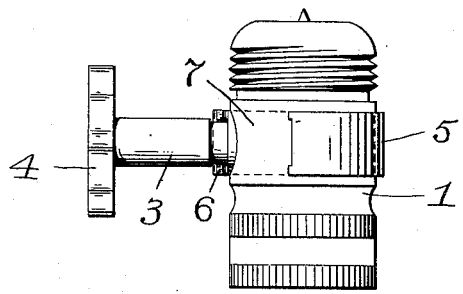
Figure 2:
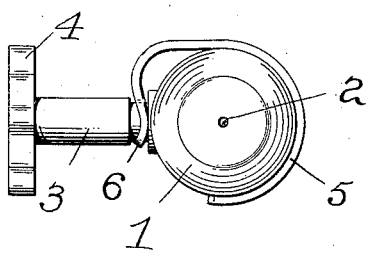
Figure 3:
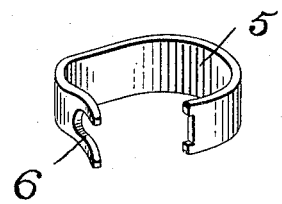
Figure 4:
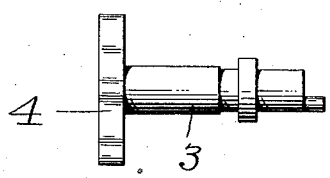

Figure 1 is a side view of a gas valve casing with the spindle in proper relation thereto, and the improved means for holding this spindle in place; Fig. 2 is a plan view of Fig. 1; Figs. 3 and 4 are views of details.

In these drawings, 1 indicates the casing of the gas regulating valve, this having a small aperture 2 at its upper end for the emission of the gas. This aperture is closed by a needle valve, as is well known in this art, and this needle valve is reciprocated longitudinally of the casing to open or close the aperture, by turning a spindle 3 which is provided with a head or finger piece 4, the said spindle extending through an opening in the casing and having a suitable connection at its inner end with the sliding needle valve, such, for instance, as an eccentric pin engaging the sliding valve. This spindle is held to its seat by a clip 5 having a bifurcated end at 6 engaging a shoulder on the spindle tending constantly to force said spindle inwardly in respect to the casing. The clip is made of spring metal, and extends more than half way around the casing of the regulating valve, which casing has a cylindrical portion at 7 to receive the clip. The clip is thus held simply by its own tension, no set screw or other device being used for this purpose.

I am aware that it has been proposed heretofore to employ a clip for holding the spindle in place, said clip, however, being secured to the casing by a set screw, but with my improvement this set screw is dispensed with and the construction is rendered less expensive and more efficient. No drilling is necessary to make provision for receiving a screw, and no opening or slot need be formed in the clip for the passage of the screw, the clip, in my invention, being held solely by the arms thereof clamping or grasping the casing. This spring clamp or clip holds the spindle with sufficient tension to prevent leakage, but also allows a greater degree of resiliency without destroying the tension under which it works. For instance if, for any reason, the spindle should be subjected to strain tending to draw it away from its seat, the spring clamp or clip will effectively resist this strain.

It will be seen that the clip is formed of flat metal, and as it extends more than half way around the casing, it finds a good bearing thereon, and as it engages the spindle at one of its ends, there is no danger of the clip becoming displaced from its effective position under any ordinary conditions of service.

I claim as my invention:

In combination in a gas regulating valve, a casing, a spindle extending through the casing to connect with the valve member therein, and a resilient clip for holding the spindle in place, formed of flat metal, having one bifurcated end fitting into an annular groove on said spindle, and having the other end frictionally embracing the surface of said casing and terminating at a point more than half way around said casing, and being supported on said casing solely by clamping itself thereto, substantially as described.

In testimony whereof, I affix my signature in presence of two witnesses.

ARTHUR A. VOCK.

Witnesses:
ROBERTA ROBINSON,
HOWARD W. JONES.

---

Copies of this patent may be obtained for five cents each, by addressing the "Commissioner of Patents, Washington, D. C."